United States Patent
Luo et al.

(10) Patent No.: US 11,689,757 B2
(45) Date of Patent: Jun. 27, 2023

(54) METHOD AND APPARATUS FOR PROVIDING VIDEO STREAMS

(71) Applicant: BEIJING ALLOOK TECHNOLOGIES CO., LTD., Beijing (CN)

(72) Inventors: Jiangchun Luo, Beijing (CN); Xiyan Chen, Beijing (CN)

(73) Assignee: BEIJING ALLOOK TECHNOLOGIES CO., LTD., Beijing (CN)

(*) Notice: Subject to any disclaimer, the term of this patent is extended or adjusted under 35 U.S.C. 154(b) by 0 days.

(21) Appl. No.: 16/963,497

(22) PCT Filed: Jan. 18, 2019

(86) PCT No.: PCT/CN2019/072389
§ 371 (c)(1),
(2) Date: Jul. 20, 2020

(87) PCT Pub. No.: WO2019/144847
PCT Pub. Date: Aug. 1, 2019

(65) Prior Publication Data
US 2021/0051357 A1  Feb. 18, 2021

(30) Foreign Application Priority Data
Jan. 26, 2018 (CN) .......................... 201810078095.7

(51) Int. Cl.
*H04N 21/258* (2011.01)
*H04N 21/25* (2011.01)
(Continued)

(52) U.S. Cl.
CPC ..... *H04N 21/25891* (2013.01); *H04N 21/251* (2013.01); *H04N 21/458* (2013.01); *H04N 21/4668* (2013.01); *H04N 21/4755* (2013.01)

(58) Field of Classification Search
CPC .......... H04N 21/25891; H04N 21/251; H04N 21/458; H04N 21/4668; H04N 21/4755;
(Continued)

(56) References Cited

U.S. PATENT DOCUMENTS 9,524,077 B1 * 12/2016 Pattan .................. H04N 21/478
2006/0059260 A1 * 3/2006 Kelly ............... H04N 21/25883
709/225
(Continued)

FOREIGN PATENT DOCUMENTS

CN  102780920 A  11/2012
CN  105404700 A  3/2016
(Continued)

OTHER PUBLICATIONS

International Search Report of International Application No. PCT/CN2019/072389.

*Primary Examiner* — Jefferey F Harold
*Assistant Examiner* — Timothy R Newlin
(74) *Attorney, Agent, or Firm* — Blank Rome LLP (57) ABSTRACT

The object of the present disclosure is to provide a method and apparatus for providing video streams. The method for providing video streams according to the present disclosure includes: providing a list of identity information of other users to the user equipment; providing video streams to the user equipment according to the identity information selected by the user equipment. The technology according to the present disclosure may raise the user's interest and attention in video-watching, and thereby improving the user's video-watching experience and satisfaction.

10 Claims, 5 Drawing Sheets (51) Int. Cl.
  *H04N 21/458* (2011.01)
  *H04N 21/466* (2011.01)
  *H04N 21/475* (2011.01)
(58) Field of Classification Search
  CPC ............. H04N 21/252; H04N 21/4662; H04N 21/258; H04N 21/25883
  See application file for complete search history.

(56) References Cited

U.S. PATENT DOCUMENTS

| | | | | |
|---|---|---|---|---|
| 2006/0062363 | A1* | 3/2006 | Albrett | H04N 21/4532 348/E7.071 |
| 2007/0283392 | A1* | 12/2007 | Tsusaka | H04N 21/44222 725/47 |
| 2009/0019488 | A1* | 1/2009 | Ruiz-Velasco | G06F 3/04892 725/43 |
| 2011/0214154 | A1* | 9/2011 | Nagano | H04N 21/4532 725/87 |
| 2012/0246161 | A1* | 9/2012 | Murakami | H04N 21/252 707/737 |
| 2013/0006765 | A1* | 1/2013 | Lee | H04N 21/4788 705/14.53 |
| 2014/0123192 | A1* | 5/2014 | Seo | H04N 21/4532 725/46 |
| 2014/0258027 | A1* | 9/2014 | Veugen | H04L 63/0428 705/26.7 |
| 2015/0350729 | A1* | 12/2015 | Reynolds | H04N 21/47217 725/34 |
| 2016/0105722 | A1* | 4/2016 | Wang | H04N 21/4668 725/14 |
| 2016/0173633 | A1* | 6/2016 | Bax | H04L 67/567 709/219 |
| 2019/0297355 | A1* | 9/2019 | Amine | H04N 21/251 |

FOREIGN PATENT DOCUMENTS

| | | |
|---|---|---|
| CN | 105512242 A | 4/2016 |
| CN | 105827513 A | 8/2016 |
| CN | 105827690 A | 8/2016 |
| CN | 106656768 A | 5/2017 |
| CN | 107071578 A | 8/2017 |
| CN | 108366275 A | 8/2018 |

* cited by examiner

METHOD AND APPARATUS FOR PROVIDING VIDEO STREAMS

CROSS REFERENCE TO RELATED APPLICATIONS

This application is a national phase application of PCT/CN2019/072389, filed Jan. 18, 2019, which claims priority to Chinese Patent Application No. 201810078095.7 filed on Jan. 26, 2018, the contents of each of which are incorporated herein by reference in their entirety.

TECHNICAL FIELD

The present disclosure relates to the field of internet video technology, in particular to a method and apparatus for providing video streams.

BACKGROUND

With the development of internet technology and network video technology, users can watch videos through computers, televisions or portable terminals. More and more video resources are provided on the network. A lot of video stream service providers would recommend to users with video content they might like based on the users' video watching records, watching habits, watching interests and information of the like, in order to better meet the users' needs. However, after using this video stream recommendation method for a period of time, the video content provided to users will gradually converge and become monotonous, hereby making the user less and less interested in the provided video content. Therefore, how to better provide video streams that users are interested in is a very worthy subject to study.

SUMMARY

According to embodiments of the present disclosure, it is desired to provide a method and apparatus for providing video streams and thereby making the user more interested in the provided video content, so that the user's video watching experience and satisfaction can be improved.

According to an embodiment of the first aspect of the present disclosure, there is provided a method for providing video streams in a video server, wherein the method comprises:

providing a list of identity information of other users to a user equipment;

providing video streams to the user equipment according to the identity information selected by the user equipment.

Specifically, the step of providing a list of identity information of other users to a user equipment comprises:

determining the list of identity information of other users according to user related information, scenario information of the user's video-watching, and feature attribute information of the user's video-watching;

sending the list of identity information of other users to the user equipment.

Specifically, the user related information comprises any of the following:

humanistic attribute information of the user;
social identity information of the user;
family identify information of the user;
behavior information of the user.

According to an embodiment of the second aspect of the present disclosure, there is provided a method for assisting in providing video streams in a user equipment, wherein the method comprises:

sending the identity information of other user to a video server.

Specifically, the method further comprises:

receiving a list of identity information of other users sent by the video server;

selecting the identity information of other user that is wished to be used according to the list of identity information of other users.

Specifically, the method further comprises:

taking the identity information of a friend in the friend list as the identity information of other user.

According to an embodiment of the third aspect of the present disclosure, there is provided an apparatus for providing video streams in the video server, wherein the apparatus comprises:

an identification providing means, for providing a list of identity information of other users to a user equipment;

a video providing means, for providing video streams to the user equipment according to the identity information selected by the user equipment.

Specifically, the identification providing means comprises:

an identification unit, for determining the list of identity information of other users according to user related information, scenario information of the user's video-watching, and feature attribute information of the user's video-watching;

an identification distributing unit, for sending the list of identity information of other users to the user equipment.

According to an embodiment of the fourth aspect of the present disclosure, there is provided an apparatus for assisting in providing video streams in a user equipment, wherein the apparatus comprises:

an identification uploading means, for sending the identity information of other user to a video server.

Specifically, the apparatus for assisting in providing video streams further comprises:

a receiving means, for receiving a list of identity information of other users sent by the video server;

a first selecting means, for selecting the identity information of other user that is wished to be used according to the list of identity information of other users.

Specifically, the apparatus for assisting in providing video streams further comprises:

a second choosing means, for taking the identity information of a friend in the friend list as the identity information of other user.

According to an embodiment of the fifth aspect of the present disclosure, there is provided a computer device, comprising: one or more processors; a memory for storing one or more programs, the one or more programs, when executed by the one or more processors, enable the one or more processors to perform the method for providing video streams as mentioned above.

According to an embodiment of the sixth aspect of the present disclosure, there is provided a computer readable storage medium storing computer program therein, wherein the computer program, when executed by a processor, implements the method for providing video streams as mentioned above.

According to an embodiment of the seventh aspect of the present disclosure, there is provided a computer program product, the computer program product, when executed by a computer device, implements the method for providing video streams as mentioned above.

According to an embodiment of the eighth aspect of the present disclosure, there is provided a user equipment, comprising: one or more processors; a memory for storing one or more programs, the one or more programs, when executed by the one or more processors, enable the one or more processors to perform the method for assisting in providing video streams as mentioned above.

According to an embodiment of the ninth aspect of the present disclosure, there is provided a computer readable storage medium storing computer program therein, wherein the computer program, when executed by a processor, implements the method for assisting in providing video streams as mentioned above.

According to an embodiment of the tenth aspect of the present disclosure, there is provided a computer program product, the computer program product, when executed by a computer device, implements the method for assisting in providing video streams as mentioned above.

Compared with the prior art, the embodiments of the present disclosure have the following advantages: the video stream server provides video streams for a user using the identity information of other users selected by the user, so that the video content provided for the user may raise the user's interest and attention in video-watching, and improve the user's video-watching experience and satisfaction. The method for providing video streams according to the embodiments of the present disclosure uses other users' related information as the user related information for selecting video content, and thereby using a whole new way to provide video content that users are interested in.

BRIEF DESCRIPTION OF THE ACCOMPANYING DRAWINGS

Other features, objectives, and advantages of the present disclosure will become more apparent through reading the following detailed depiction of the non-limitative embodiments with reference to the accompanying drawings.

Same or similar reference numbers in the drawings represent the same or similar components.

DETAILED DESCRIPTION

Before discussing example embodiments in more detail, it is noted that some example embodiments are described as processes or methods depicted as flow charts. Although the flow charts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

The "computer device" (also "computer") mentioned in this context refers to the smart electronic device that can carry out numerical computations and/or logical computations and other predetermined processing procedures through running predetermined programs or instructions, and may comprise a processor and a memory. It is by the processor that the program instructions prestored in the memory are executed to carry out the predetermined processing procedures, or by ASIC, FPGA, DSP and other like hardware that the predetermined processing procedures are carried out, or some combination of the two mentioned scenarios. A computer device includes, but is not limited to, a server, a personal computer, a laptop computer, a tablet computer, a smartphone, etc.

The computer device includes user equipment and network device. Wherein, the user equipment includes, but is not limited to, a computer, a smartphone, a PDA, etc.; the network device includes, but is not limited to, a single network server, a server group composed of multiple network servers, or a cloud which is based upon cloud computing and composed of a large number of computers or network servers, wherein cloud computing is a type of distributed computing, i.e. a super virtual computer composed of a cluster of loosely coupled computer sets. Wherein, the computer device can run individually to implement the present disclosure, or can be connected in a network and carry out interoperations with other computer devices in the network to implement the present disclosure. Wherein, the network in which the computer device is located includes, but is not limited to, internet, wide area network, metropolitan area network, local area network, VPN network, etc.

It should be noted that, the user equipment, network device and network are only for example, other network devices and networks that are now existing or might emerge later, if applicable to the present disclosure, should also be included within the protection scope of the present disclosure and be included herein by reference.

Methods discussed below, some of which are illustrated by the flow charts, may be implemented by hardware, software, firmware, middleware, microcode, hardware description language, or any combination thereof. When implemented in software, firmware, middleware or microcode, the program code or code segments to perform the necessary tasks may be stored in a machine or computer readable medium, such as storage medium. A processor(s) may perform the necessary tasks.

Specific structural and functional details disclosed herein are merely representative and are for the purposes of describing exemplary embodiments of the present disclosure. However, the present disclosure may be embodied in many alternative forms and should not be construed as limited to only the embodiments set forth herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functions/acts involved.

Hereinafter, further detailed description will be made to the present disclosure with reference to the accompanying drawings.

Figure 1:
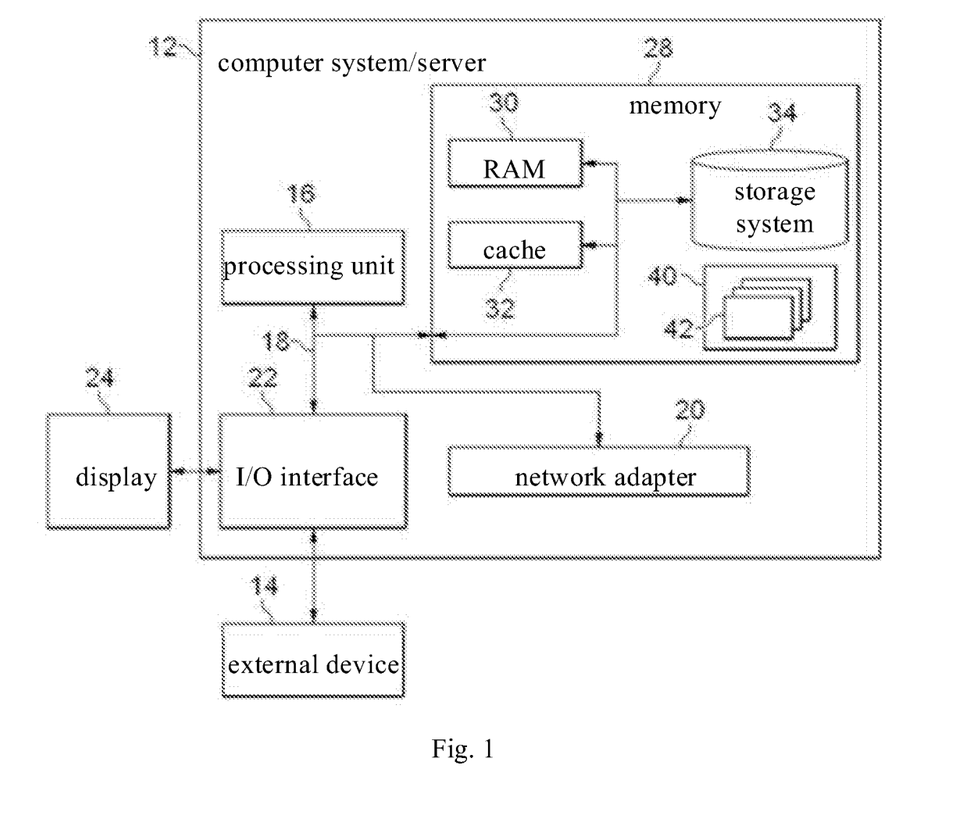
FIG. 1 shows a block diagram of an example computer system/server suitable for realizing the implementation of the present disclosure.

FIG. 1 shows a block diagram of an example computer system/server suitable for realizing the implementation of the present disclosure. The computer system/server 12 shown in FIG. 1 is only an example, and not intended to limit in any way the functionality and range of application of the embodiments of the present disclosure.

As shown in FIG. 1, the computer system/server 12 is presented in the form of a general-purpose computing device. The components of the computer system/server 12 may include (but are not limited to): one or more processors or processing units 16, a system memory 28, and a bus 18 connecting different system components (including the system memory 28 and the processing unit 16).

The bus 18 represents one or more types of several bus architectures, including a memory bus or a memory controller, a peripheral bus, a graphics acceleration port, a processor or a local bus using any of multiple bus architectures. For example, these architectures include, but are not limited to, the industrial standard architecture (ISA) bus, the microchannel architecture (MAC) bus, the enhanced ISA bus, the Video Electronics Standards Association (VESA) local bus, and the peripheral component interconnection (PCI) bus.

The computer system/server 12 typically includes a variety of computer system readable media. These media may be any available media that can be accessed by the computer system/server 12, including volatile and non-volatile media, removable and non-removable media.

The memory 28 may include computer system readable media in the form of volatile memory, such as a Random Access Memory (RAM) 30 and/or a cache memory 32. The computer system/server 12 may further include other removable/non-removable, volatile/non-volatile computer system storage media. Just as an example, a storage system 34 may be used to read from and write into non-removable, non-volatile magnetic media (not shown in FIG. 1, commonly referred to as a "hard drive"). Although not shown in FIG. 1, a magnetic disk drive can be provided for reading from and writing into removable, non-volatile magnetic disks (such as "floppy disks"), and an optical disk drive can be provided for reading from and writing into removable, non-volatile optical disks (such as a CD-ROM, a DVD-ROM, or other optical media). In these cases, each drive may be connected with the bus 18 through one or more data media interfaces. The memory 28 may include at least one program product having a set of (for example, at least one) program modules configured to perform the functions of the embodiments of the present disclosure.

A program/utility 40 with a set of (at least one) program modules 42 may be stored in, for example, the memory 28. Such a program module 42 includes, but is not limited to, an operating system, one or more application programs, other program modules and program data, and each or some combination of these examples may include an implementation of network environment. The program module 42 generally performs the functions and/or methods in the described embodiments of the present disclosure.

The computer system/server 12 may also communicate with one or more external devices 14 (such as keyboard, pointing device, display 24, etc.), and may also communicate with one or more devices that enable the user to interact with the computer system/server 12, and/or communicate with any device (such as a network card, a modem, etc.) that enables the computer system/server 12 to communicate with one or more other computing devices. This kind of communication may be performed via an input/output (I/O) interface 22. In addition, the computer system/server 12 may also communicate with one or more networks (such as a Local Area Networks (LAN), a Wide Area Network (WAN), and/or a public network (such as the Internet)) through a network adapter 20. As illustrated in the figure, the network adapter 20 communicates with other modules of the computer system/server 12 via the bus 18. It should be understood that, although not shown in FIG. 1, other hardware and/or software modules may be used in connection with the computer system/server 12, including, but not limited to, microcode, a device drive, a redundant processing unit, an external disk drive array, a RAID system, a tape drive, and a data backup and storage system.

The processing unit 16 performs various functional applications and data processing through running programs stored in the memory 28.

For example, the memory 28 stores the computer programs for performing various functions and processes of the present disclosure, and when the corresponding computer programs are executed by the processing unit 16, the identification of intention of incoming call at the network end according to the present disclosure is implemented.

The specific functions/steps for determining the video streams to be provided according to the present disclosure will be detailed in the following.

Figure 2:
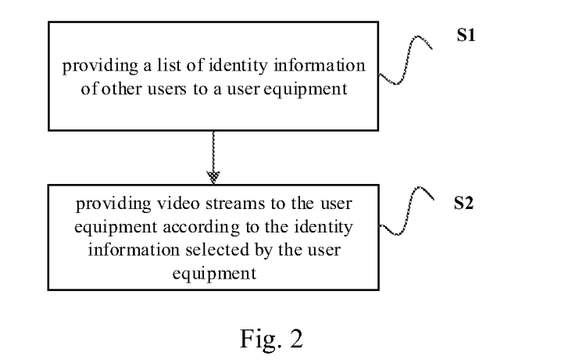
FIG. 2 shows a flow diagram of a method for providing video streams according to an embodiment of the present disclosure.

FIG. 2 shows a flow diagram of a method for providing video streams in the video server according to an embodiment of the present disclosure. As shown in the figure, the video server according to the embodiment of the present disclosure may be implemented through a network device. The network device includes, but is not limited to, a single network server, a server group composed of multiple network servers, or a cloud which is based on cloud computing and composed of a large number of computers or network servers, wherein, the cloud computing is a type of distributed computing, i.e. a super virtual computer composed of a cluster of loosely coupled computer sets.

As shown in FIG. 2, the method for providing video streams according to the embodiment includes step S1 and step S2.

Firstly, in step S1, a list of identity information of other users is provided to the user equipment. The user equipment according to the embodiment of the present disclosure includes, but is not limited to, any kind of electronic product that can perform human-machine interactions with the user through a keyboard, a mouse, a remote control, a touchpad, or a handwriting device and other like means, such as a computer, a smart phone, a PDA, an IPTV. The communication between network device and user equipment is independent of each other and may be based upon packet data transmission mode such as the TCP/IP protocol, the UDP protocol, etc., or may be based upon wireless communication or other end-to-end communication protocols. It should be noted that, the network device, user equipment and network or communication means between network device and user equipment are only for example, other existing or future possibly developed network device, user equipment, networks and communication means, if applicable to the present disclosure, should also be included within the protection scope of the present disclosure and incorporated here by reference.

In the step S1, the video server generates a list of identity information of other users and send it to the user equipment through the communication means between the video server and the user equipment. In the embodiments of the present disclosure, "other users" refer to other registered users aside from the registered user who is currently watching videos through the user equipment. The "other users" may be real users registered on the video server, or may be users virtualized by the video server. The list of identity information includes the identity information of one or more users. The identity information is the information that identifies a user's identity. The identity information includes the identifier of a user, user related information, etc. The identifier of a user is not the registered username. Generally, considering the user privacy, the screen name or real name of a user normally would not appear in the identity information. The identifier representing a user may be random characters that don't have real meaning, or may be words that are used to represent some typical feature of a user, or may be reflection of the feature of a certain aspect in the user related information. For example, CEO of a private business, born in the 1980s, born in the 1960s, big World of Warcraft enthusiast, print ad designer, etc., may all be used as the identifier of a user. The user related information is the information that is related to a user's identity or behaviors and the like. In the embodiments of the present disclosure, the user related information includes at least one of the following: humanistic attribute information of the user; social identity information of the user; family identity information of the user; behavior information of the user. The humanistic attribute information of the user is the embodiment of the user's values, including the user's views on the politics, economy and society. For example, support President Trump or support Hillary Clinton, pursuit of fulfillment in work, pursuit of wealth, etc. The social identity information of the user is the information related to the user's identity in his/her social environment. For example, CEO of a state-owned business, manager of a private business, software engineer, Chief Human resources Officer of a Fortune 500 company. The family identity information of the user is the information related to the user's identity in the family. For example, father of an 8-year-old boy, fulltime housewife. The behavior information of the user is the information related to the user's behaviors, interests, hobbies, etc. For example, big World of Warcraft enthusiast, red wine enthusiast, 10-time marathon finisher. Based on this user related information, preliminary and intuitive knowledge can be gained about the user represented by this information. The content of the user relation information that the user selects not to disclose will not appear in the identity information provided by the video server.

The list of identity information of other users provided by the video server may only include simple identifiers, or may include part of or the whole content of the user related information. For example, the server first sends a list of user identifiers of other users to the user equipment. For example, a list including identifiers such as "newbie of Arena of Valor, beginner of Arena of Valor, advanced player of Arena of Valor" is provided to the user equipment. The user may select directly according to the user identifiers, or may select according to the detailed content of the user related information displayed in the floating interface or the subsequent level or levels of interfaces after the user identifier. For example, the content of the user related information after the user identifier "advanced player of Arena of Valor" further includes: born in the 1980s, father of a 5-year-old child, print advertising designer, badminton enthusiast and like information.

In the step S2, the video server provides video streams to the user equipment according to the identity information selected by the user equipment. The video-watching user selects one of the identity information from the list of identity information of other users provided by the video server on the user equipment. The user equipment reports that identity information to the video server. Based on the identity information of other user reported by the user equipment, the video server determines the other user and user related information corresponding to the identity information, and then uses the user related information of the other user to provide video service for the user equipment. For example, the registered username of user Xiao Ming in the video server is "Xiao Zhang", the video server uses the user related information of "Xiao Zhang" to provide videos for the user equipment, that is to say, the video content provided to "Xiao zhang" takes into account the content including the values, interests and hobbies, social identity, family identity and other information of "Xiao Zhang". User Xiao Ming selects the identity information of one other user, for example the identity information of one other user with the user identifier "CEO of a private business born in the 1980s", then the video server will use the user related information of "CEO of a private business born in the 1980s", that is, the values, interests and hobbies, social identity, family identity and like information of the user "CEO of a private business born in the 1980s", as the user related information of "Xiao Zhang" to provide video service for "Xiao Zhang". The identity information of the other user selected by the user equipment may be information that only includes the user identifier, the video server can find the user related information of the corresponding user according to the user identifier, and then uses the user related information of that other user to provide video service for the user equipment. The identity information of the other user selected by the user equipment may be the user identifier of other friend user in his/her own friend list. The video server can find the user related information corresponding to the friend user identifier according to the user identifier of the other friend user, and then uses the user related information of the friend user to provide video service for the user equipment.

Figure 3:
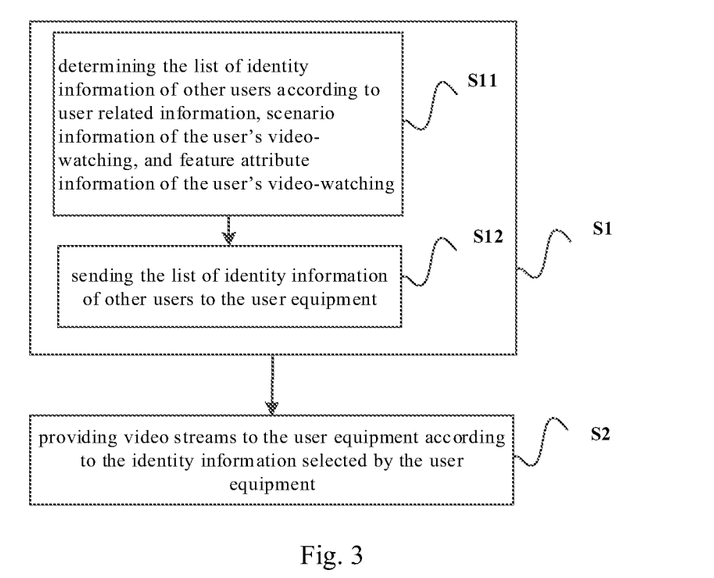
FIG. 3 shows a flow diagram of a method for providing video streams according to a preferred embodiment of the present disclosure.

FIG. 3 is the schematic flow chart of a method for providing video streams according to a preferred embodiment of the present disclosure. As shown in FIG. 3, the method according to a preferred embodiment of the present disclosure includes step S11, step S12 and step S2. Wherein, the step S1 and the step S2 shown in FIG. 3 are the same as the steps S1 and S2 described above with reference to FIG. 2, and the step S1 in the preferred embodiment shown by FIG. 3 includes step S11 and step S12.

In the step S11, the video server determines the list of identity information of other users according to the user related information, scenario information of the user's video-watching, and feature attribute information of the user's video-watching. The scenario information of the user's video-watching includes the time and/or place of the user's video-watching. The feature attribute information of the user's video-watching includes the types of videos the user like, the ways the user watches videos, and like information. The types of videos the user like include, for example, news, variety entertainment programs, horror films, informative documentaries, etc. The ways the user watches videos include, for example, whether or not fast forwarding a lot or rewinding or the like. The video server may employ a matching method, in order to match the user related information, scenario information of the user's video-watching and feature attribute information of the user's video-watching on the user equipment with the user related information of other users, scenario information of other users' video-watching and feature attribute information of other users' video-watching. The identifier information of other users with the highest matching scores and above a certain threshold is sent to the user equipment. The video server may set different weight values for the matching results of the respective information items, and the selecting policy of the video server may be adjusted through different weight values. For example, higher weight values are assigned to important information or information items that might interest the user. Subsequently, all the user related information items are weighted and averaged and the matching results are compared with a threshold, with one or more other users ranking top and above the threshold being selected. Afterwards, the user identifiers of the selected other users are determined. A user identifier may be random characters that don't have real meaning, or may be words that are used to represent some typical feature of a user, or may be reflection of the feature of a certain aspect in the user related information. A user identifier and the corresponding user related information make up the identity information of a user. In the end, the identity information of these multiple other users is determined as a list of identity information of other users to be sent to the user equipment. It should be noted that, the above-mentioned process of the video server determining the list of identity information of other users is only for example, other solutions for the video server to determine the list of identity information of other users that are now existing or might emerge later, if applicable to the present disclosure, should also be included within the protection scope of the present disclosure and be included herein by reference.

In the step S12, the video server sends the list of identity information of other users to the user equipment. In the step S11, the video server determines the list of identity information of other users to be sent to the user equipment, including identifiers, identity information of user and the like. In the step S12, the video server determines the way to send the list of identity information of other users. The server may send all the content of the identity information of other users to the user equipment, or may only send the user identifiers of other users, or the key information in the identity information, or the information content that interests the user. The video server may regularly and proactively send the list of identity information of other users in a push way; or may send it after receiving the quest from the user equipment; or may send it in an event-triggered way, for example, send it at a certain time while the user is using the video service, such as before the user exits the video service or when the user just begins to use the video service.

Figure 4:
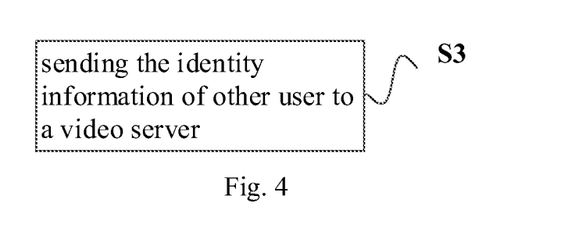
FIG. 4 shows a flow diagram of assisting in providing video streams according to an embodiment of the present disclosure.

FIG. 4 shows a flow diagram of a method for assisting in providing video streams in the user equipment according to an embodiment of the present disclosure. The user equipment according to the embodiment of the present disclosure includes, but is not limited to, any kind of electronic product that can perform human-machine interactions with the user through a keyboard, a mouse, a remote control, a touchpad, or a handwriting device and other like means, such as a computer, a smartphone, a PDA, an IPTV.

As shown in FIG. 4, the method for assisting in providing video streams according to this embodiment includes step S3. In the step S3, the user equipment sends the identity information of other user to the video server. In the embodiments of the present disclosure, "other user" refer to other registered user aside from the registered user who is currently logged into the video server. The "other user" may be real users registered on the video server, or may be users virtualized by the video server. The identity information is the information that identifies a user's identity. The identity information includes the identifier of a user, user related information, etc. The identifier of a user is not the registered username. Generally, considering the user privacy, the screen name or real name of a user normally would not appear in the identity information. The identifier representing a user may be random characters that don't have real meaning, or may be words that are used to represent some typical feature of a user, or may be reflection of the feature of a certain aspect in the user related information. For example, CEO of a private business, born in the 1980s, born in the 1960s, big World of Warcraft enthusiast, print ad designer, etc., may all be used as the identifier of a user. The user related information is the information that is related to a user's identity or behaviors and the like. In the embodiments of the present disclosure, the user related information includes at least one of the following: humanistic attribute information of the user; social identity information of the user; family identity information of the user; behavior information of the user. The humanistic attribute information of the user is the embodiment of the user's values, including the user's views on the politics, economy and society. For example, support President Trump or support Hillary Clinton, pursuit of fulfillment in work, pursuit of wealth, etc. The social identity information of the user is the information related to the user's identity in his/her social environment. For example, CEO of a state-owned business, manager of a private business, software engineer, Chief Human resources Officer of a Fortune 500 company. The family identity information of the user is the information related to the user's identity in the family. For example, father of an 8-year-old boy, fulltime housewife. The behavior information of the user is the information related to the user's behaviors, interests, hobbies, etc. For example, big World of Warcraft enthusiast, red wine enthusiast, 10-time marathon finisher. Based on this user related information, preliminary and intuitive knowledge can be gained about the user represented by this information.

Figure 5:
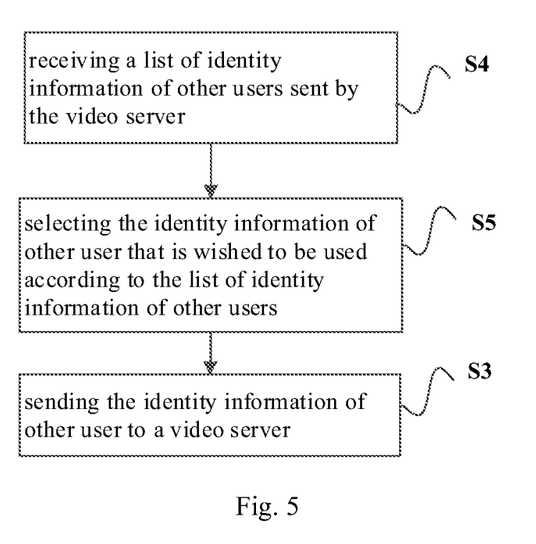
FIG. 5 shows a flow diagram of assisting in providing video streams according to a preferred embodiment of the present disclosure.

FIG. 5 shows a flow diagram of assisting in providing video streams according to a preferred embodiment of the present disclosure. As shown in FIG. 5, the method for assisting in providing video streams according to the preferred embodiment of the present disclosure includes step S3, step S4 and step S5. Wherein, the step S3 shown in FIG. 5 is the same as the step S3 described above with reference to FIG. 4. In the preferred embodiment shown in FIG. 3, the method for assisting in providing video streams according to the embodiment of the present disclosure further includes step S4 and step S5.

In the step S4, the user equipment receives the list of identity information of other users sent by the video server. The video server may regularly and proactively send the list of identity information of other users in a push way; or may send it after receiving the quest from the user equipment; or may send it in an event-triggered way, for example, send it at a certain time while the user is using the video service, such as before the user exits the video service or when the user just begins to use the video service. After receiving the list of identity information of other users sent by the video server, the user equipment saves or displays the list of identity information of other users on the screen.

In the step S5, the user equipment selects the identity information of other user that is wished to be used according to the list of identity information of other users. The user looks through the list of identity information of other users on the user equipment, selects the identity information of another user that he/she is interested in from the list, that is, taking the user related information corresponding to that identity information as the user related information that the user wants to use.

In another preferred embodiment of the present disclosure, the method for assisting in providing video streams according to embodiment of the present disclosure further includes step S6 (not shown). In the step S6, the user equipment takes the identity information of a friend in the friend list as the identity information of other user. The video server or a third-party social app provides the function for adding friends between users. The user can select the identity information of a friend from the friend list as the identity information of other user to be sent to the video server. The user equipment may provide only the identifier of the friend, the video server determines the user related information of the friend according to the identifier, and provide video streams to the user according to the user related information of the friend.

Figure 6:
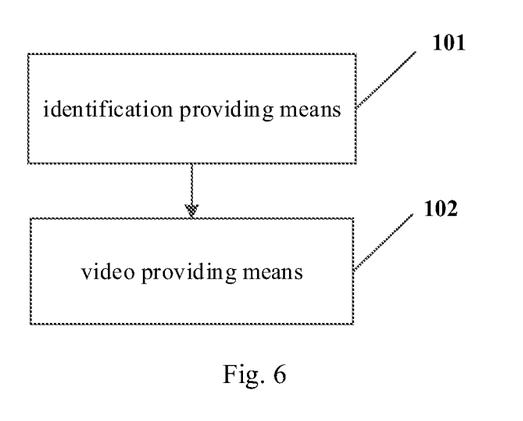
FIG. 6 shows a structural diagram of an apparatus for providing video streams according to an embodiment of the present disclosure.

FIG. 6 shows a structural diagram of an apparatus for providing video streams according to an embodiment of the present disclosure. As shown in the figure, the apparatus for providing video streams according to the embodiment of the present disclosure may be implemented through a network device. The network device includes, but is not limited to, a single network server, a server group composed of multiple network servers, or a cloud which is based on cloud computing and composed of a large number of computers or network servers, wherein, the cloud computing is a type of distributed computing, i.e. a super virtual computer composed of a cluster of loosely coupled computer sets.

As shown in FIG. 6, the apparatus for providing video streams according to the embodiment includes an identification providing means 101 and a video providing means 102.

Firstly, identification providing means 101 is used to provide a list of identity information of other users to the user equipment. The user equipment according to the embodiment of the present disclosure includes, but is not limited to, any kind of electronic product that can perform human-machine interactions with the user through a keyboard, a mouse, a remote control, a touchpad, or a handwriting device and other like means, such as a computer, a smart phone, a PDA, an IPTV. The communication between network device and user equipment is independent of each other and may be based upon packet data transmission mode such as the TCP/IP protocol, the UDP protocol, etc., or may be based upon wireless communication or other end-to-end communication protocols. It should be noted that, the network device, user equipment and network or communication means between network device and user equipment are only for example, other existing or future possibly developed network device, user equipment, networks and communication means, if applicable to the present disclosure, should also be included within the protection scope of the present disclosure and incorporated here by reference.

The identification providing means 101 generates a list of identity information of other users and send it to the user equipment through the communication means between the video server and the user equipment. In the embodiments of the present disclosure, "other users" refer to other registered users aside from the registered user who is currently watching videos through the user equipment. The "other users" may be real users registered on the video server, or may be users virtualized by the video server. The list of identity information includes the identity information of one or more users. The identity information is the information that identifies a user's identity. The identity information includes the identifier of a user, user related information, etc. The identifier of a user is not the registered username. Generally, considering the user privacy, the screen name or real name of a user normally would not appear in the identity information. The identifier representing a user may be random characters that don't have real meaning, or may be words that are used to represent some typical feature of a user, or may be reflection of the feature of a certain aspect in the user related information. For example, CEO of a private business, born in the 1980s, born in the 1960s, big World of Warcraft enthusiast, print ad designer, etc., may all be used as the identifier of a user. The user related information is the information that is related to a user's identity or behaviors and the like. In the embodiments of the present disclosure, the user related information includes at least one of the following: humanistic attribute information of the user; social identity information of the user; family identity information of the user; behavior information of the user. The humanistic attribute information of the user is the embodiment of the user's values, including the user's views on the politics, economy and society. For example, support President Trump or support Hillary Clinton, pursuit of fulfillment in work, pursuit of wealth, etc. The social identity information of the user is the information related to the user's identity in his/her social environment. For example, CEO of a state-owned business, manager of a private business, software engineer, Chief Human resources Officer of a Fortune 500 company. The family identity information of the user is the information related to the user's identity in the family. For example, father of an 8-year-old boy, fulltime housewife. The behavior information of the user is the information related to the user's behaviors, interests, hobbies, etc. For example, big World of Warcraft enthusiast, red wine enthusiast, 10-time marathon finisher. Based on this user related information, preliminary and intuitive knowledge can be gained about the user represented by this information. The content of the user relation information that the user selects not to disclose will not appear in the identity information provided by the identification providing means 101.

The list of identity information of other users provided by the identification providing means 101 may only include simple identifiers, or may include part of or the whole content of the user related information. For example, the identification providing means 101 first sends a list of user identifiers of other users to the user equipment. For example, a list including identifiers such as "newbie of Arena of Valor, beginner of Arena of Valor, advanced player of Arena of Valor" is provided to the user equipment. The user may select directly according to the user identifiers, or may select according to the detailed content of the user related information displayed in the floating interface or the subsequent level or levels of interfaces after the user identifier. For example, the content of the user related information after the user identifier "advanced player of Arena of Valor" further includes: born in the 1980s, father of a 5-year-old child, print advertising designer, badminton enthusiast and like information.

The video providing means 102 is used to provide video streams to the user equipment according to the identity information selected by the user equipment. The video-watching user selects one of the identity information from the list of identity information of other users provided by the video providing means 102 on the user equipment. The user equipment reports that identity information to the video providing means 102. Based on the identity information of other user reported by the user equipment, the video providing means 102 determines the other user and user related information corresponding to the identity information, and then uses the user related information of the other user to provide video service for the user equipment. For example, the registered username of user Xiao Ming in the video server is "Xiao Zhang", the video providing means 102 uses the user related information of "Xiao Zhang" to provide videos for the user equipment, that is to say, the video content provided to "Xiao zhang" takes into account the content including the values, interests and hobbies, social identity, family identity and other information of "Xiao Zhang". User Xiao Ming selects the identity information of one other user, for example the identity information of one other user with the user identifier "CEO of a private business born in the 1980s", then the video providing means 102 will use the user related information of "CEO of a private business born in the 1980s", that is, the values, interests and hobbies, social identity, family identity and like information of the user "CEO of a private business born in the 1980s", as the user related information of "Xiao Zhang" to provide video service for "Xiao Zhang". The identity information of the other user selected by the user equipment may be information that only includes the user identifier, the video providing means 102 can find the user related information of the corresponding user according to the user identifier, and then uses the user related information of that other user to provide video service for the user equipment. The identity information of the other user selected by the user equipment may be the user identifier of other friend user in his/her own friend list. The video providing means 102 can find the user related information corresponding to the friend user identifier according to the user identifier of the other friend user, and then uses the user related information of the friend user to provide video service for the user equipment.

Figure 7:
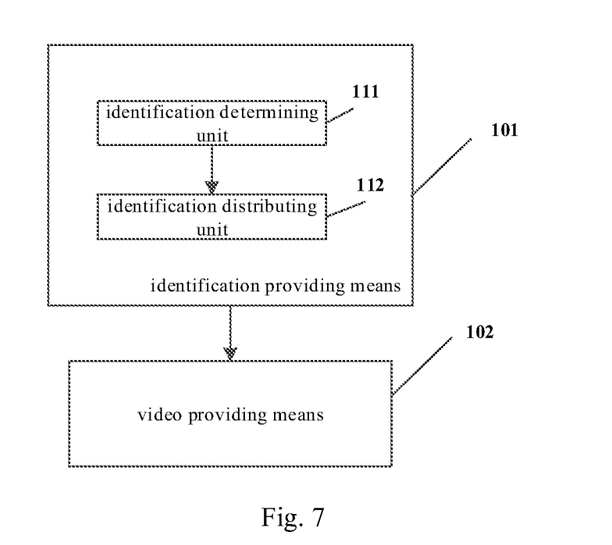
FIG. 7 shows a structural diagram of an apparatus for providing video streams according to a preferred embodiment of the present disclosure.

FIG. 7 shows a structural diagram of an apparatus for providing video streams according to a preferred embodiment of the present disclosure. As shown in FIG. 7, the apparatus according to the preferred embodiment of the present disclosure includes an identification determining unit 111, an identification distributing unit 112 and a video providing means 102. Wherein, the identification providing means 101 and the video providing means 102 shown in FIG. 7 are the same as the identification providing means 101 and the video providing means 102 described above with reference to FIG. 6, and the identification providing means 101 in the preferred embodiment shown by FIG. 7 includes the identification determining unit 111 and the identification distributing unit 112.

The identification determining unit 111 is used to determine the list of identity information of other users according to the user related information, scenario information of the user's video-watching, and feature attribute information of the user's video-watching. The scenario information of the user's video-watching includes the time and/or place of the user's video-watching. The feature attribute information of the user's video-watching includes the types of videos the user like, the ways the user watches videos, and like information. The types of videos the user like include, for example, news, variety entertainment programs, horror films, informative documentaries, etc. The ways the user watches videos include, for example, whether or not fast forwarding a lot or rewinding or the like. The identification determining unit 111 may employ a matching method, in order to match the user related information, scenario information of the user's video-watching and feature attribute information of the user's video-watching on the user equipment with the user related information of other users, scenario information of other users' video-watching and feature attribute information of other users' video-watching. The identifier information of other users with the highest matching scores and above a certain threshold is sent to the user equipment. The identification determining unit 111 may set different weight values for the matching results of the respective information items, and the selecting policy may be adjusted through different weight values. For example, higher weight values are assigned to important information or information items that might interest the user. Subsequently, all the user related information items are weighted and averaged and the matching results are compared with a threshold, with one or more other users ranking top and above the threshold being selected. Afterwards, the user identifiers of the selected other users are determined. A user identifier may be random characters that don't have real meaning, or may be words that are used to represent some typical feature of a user, or may be reflection of the feature of a certain aspect in the user information. A user identifier and the corresponding user related information make up the identity information of a user. In the end, the identity information of these multiple other users is determined as a list of identity information of other users to be sent to the user equipment. It should be noted that, the above scheme of the identification determining unit 111 is only for example, other existing or future schemes of the identification determination unit 111, if applicable to the present disclosure, should also be included within the protection scope of the present disclosure and be included herein by reference.

The identification distributing unit 112 is used to send the list of identity information of other users to the user equipment. The identification determination unit 111 determines the list of identity information of other users to be sent to the user equipment, including identifiers, identity information of user and the like. The identification distributing unit 112 determines the way to send the list of identity information of other users. The identification distributing unit 112 may send all the content of the identity information of other users to the user equipment, or may only send the user identifiers of other users, or the key information in the identity information, or the information content that interests the user. The identification distributing unit 112 may regularly and proactively send the list of identity information of other users in a push way; or may send it after receiving the quest from the user equipment; or may send it in an event-triggered way, for example, send it at a certain time while the user is using the video service, such as before the user exits the video service or when the user just begins to use the video service.

Figure 8:
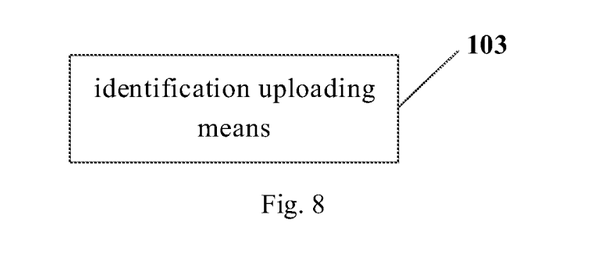
FIG. 8 shows a structural diagram of an apparatus for assisting in providing video streams according to an embodiment of the present disclosure.

FIG. 8 shows a structural diagram of an apparatus for assisting in providing video streams in the user equipment according to an embodiment of the present disclosure. The user equipment according to the embodiment of the present disclosure includes, but is not limited to, any kind of electronic product that can perform human-machine interactions with the user through a keyboard, a mouse, a remote control, a touchpad, or a handwriting device and other like means, such as a computer, a smartphone, a PDA, an IPTV.

As shown in FIG. 8, the apparatus for assisting in providing video streams according to this embodiment includes an identification uploading means 103. The identification uploading means 103 is used to send the identity information of other user to the video server. In the embodiments of the present disclosure, "other user" refer to other registered user aside from the registered user who is currently logged into the video server. The "other user" may be real users registered on the video server, or may be users virtualized by the video server. The identity information is the information that identifies a user's identity. The identity information includes the identifier of a user, user related information, etc. The identifier of a user is not the registered username. Generally, considering the user privacy, the screen name or real name of a user normally would not appear in the identity information. The identifier representing a user may be random characters that don't have real meaning, or may be words that are used to represent some typical feature of a user, or may be reflection of the feature of a certain aspect in the user related information. For example, CEO of a private business, born in the 1980s, born in the 1960s, big World of Warcraft enthusiast, print ad designer, etc., may all be used as the identifier of a user. The user related information is the information that is related to a user's identity or behaviors and the like. In the embodiments of the present disclosure, the user related information includes at least one of the following: humanistic attribute information of the user; social identity information of the user; family identity information of the user; behavior information of the user. The humanistic attribute information of the user is the embodiment of the user's values, including the user's views on the politics, economy and society. For example, support President Trump or support Hillary Clinton, pursuit of fulfillment in work, pursuit of wealth, etc. The social identity information of the user is the information related to the user's identity in his/her social environment. For example, CEO of a state-owned business, manager of a private business, software engineer, Chief Human resources Officer of a Fortune 500 company. The family identity information of the user is the information related to the user's identity in the family. For example, father of an 8-year-old boy, fulltime housewife. The behavior information of the user is the information related to the user's behaviors, interests, hobbies, etc. For example, big World of Warcraft enthusiast, red wine enthusiast, 10-time marathon finisher. Based on this user related information, preliminary and intuitive knowledge can be gained about the user represented by this information.

Figure 9:
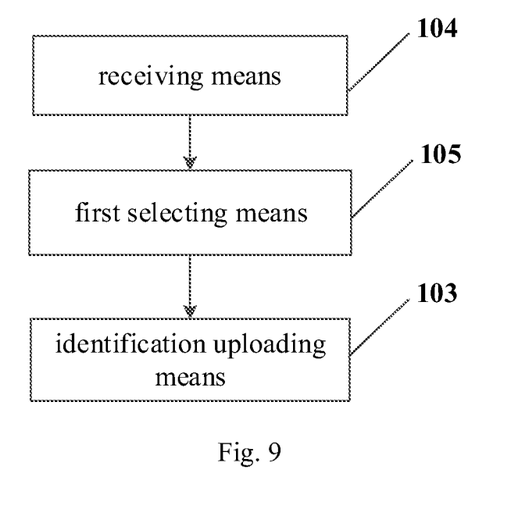
FIG. 9 shows a structural diagram of an apparatus for assisting in providing video streams according to a preferred embodiment of the present disclosure.

FIG. 9 shows a structural diagram of an apparatus for assisting in providing video streams according to a preferred embodiment of the present disclosure. As shown in FIG. 9, the apparatus for assisting in providing video streams according to the preferred embodiment of the present disclosure includes an identification uploading means 103, a receiving means 104 and a first selecting means 105. Wherein, the identification uploading means 103 shown in FIG. 9 is the same as the identification uploading means 103 described above with reference to FIG. 8. In the preferred embodiment shown in FIG. 9, the apparatus for assisting in providing video streams according to the embodiment of the present disclosure further includes the receiving means 104 and the first selecting means 105.

The receiving means 104 is used to receive the list of identity information of other users sent by the video server. The video server may regularly and proactively send the list of identity information of other users in a push way; or may send it after receiving the quest from the receiving means 104; or may send it in an event-triggered way, for example, send it at a certain time while the user is using the video service, such as before the user exits the video service or when the user just begins to use the video service. After receiving the list of identity information of other users sent by the video server, the receiving means 104 saves or displays the list of identity information of other users on the screen.

The first selecting means 105 is used to select the identity information of other user that is wished to be used according to the list of identity information of other users. The user looks through the list of identity information of other users on the user equipment, the first selecting means 105, according to the identity information of another user that the user is interested in and selects from the list, takes the user related information corresponding to the identity information as the user related information that the user wants to use.

In another preferred embodiment of the present disclosure, the apparatus for assisting in providing video streams according to embodiment of the present disclosure further includes a second selecting means 106 (not shown). The second selecting means 106 is used to take the identity information of a friend in the friend list as the identity information of other user. The video server or a third-party social app provides the function for adding friends between users. The second selecting means 106 takes the identification information of a friend selected by the user in the friend list as the identification information of other user to be sent to the video server. The second selecting means 106 may provide only the identifier of the friend, the video server determines the user related information of the friend according to the identifier, and provide video streams to the user according to the user related information of the friend.

It needs to be noted that, the present disclosure may be implemented in software and/or in a combination of software and hardware. For example, the various apparatuses of the present disclosure may be implemented using an Application Specific Integrated Circuit (ASIC) or any other similar hardware device. In one embodiment, the software programs of the present disclosure may be executed by a processor in order to carry out the steps or functions mentioned above. Likewise, the software programs of the present disclosure, including the related data structures, may be stored in a computer readable medium. The computer readable medium may be a computer readable signal medium or a computer readable storage medium. A computer readable storage medium may be, for example, but not limited to, an electric, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory (RAM), a Read-only Memory (ROM), an Erasable Programmable Read-only Memory (EPROM or Flash memory), an optical fiber, a portable Compact Disc Read-only Memory (CD-ROM), an optical storage device, a magnetic storage device, or any suitable combination of the foregoing. In the context of this document, a computer readable storage medium may be any tangible medium that contains or stores programs for use by or in connection with an instruction execution system, apparatus or device.

A computer readable signal medium may include a data signal, with computer readable program code carried therein, propagated in baseband or as part of a carrier wave. Such a propagated data signal may take any of a variety of forms, including, but not limited to, an electromagnetic signal, an optical signal, or any suitable combination thereof. A computer readable signal medium may also be any computer readable medium that is not a computer readable storage medium and can communicate, propagate or transport programs for use by or in connection with an instruction execution system, apparatus or device.

Program code contained on a computer readable medium may be transmitted using any appropriate medium, including but not limited to wireless, wireline, optical fiber cable, RF, etc., or any suitable combination of the foregoing.

Computer program code for carrying out operations of the present disclosure may be written in one or more programming languages or a combination thereof, including object-oriented programming languages such as Java, Smalltalk, C++ or the like, and conventional procedural programming languages such as the "C" language or similar programming languages. The program code may be executed entirely on the user's computer, partly on the user's computer, as a stand-alone software package, partly on the user's computer and partly on a remote computer, or entirely on a remote computer or server. In the scenario that involves a remote computer, the remote computer may be connected to the user's computer through any type of network, including a Local Area Network (LAN) or a Wide Area Network (WAN), or the connection may be made to an external computer (for example, using an Internet service provider to connect through the Internet).

In addition, some of the steps or functions of the present disclosure may be implemented in hardware, for example, as a circuit that cooperates with a processor in order to perform each step or function.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

The invention claimed is:

1. A method for providing video streams in a video server, the method comprising:
   providing a list of identity information of other users to a user equipment, wherein other users are users other than a user using the user equipment; and
   providing video streams to the user equipment according to the identity information selected by the user equipment;
   wherein providing the list of identity information of other users to the user equipment comprises:
   determining the list of identity information of other users according to user-related information, scenario information of the user's video-watching, and feature attribute information of the user's video-watching, wherein employing a matching method, in order to match the user-related information, scenario information of the user's video-watching and feature attribute information of the user's video-watching on the user equipment with the user-related information of other users, scenario information of other users' video-watching and feature attribute information of other users' video-watching, the identifier information of other users with the highest matching scores and above a certain threshold is sent to the user equipment; and
   sending the list of identity information of other users to the user equipment.

2. The method according to claim 1, wherein the user-related information comprises at least one of the following:
   humanistic attribute information of the user;
   social identity information of the user;
   family identify information of the user; or
   behavior information of the user.

3. A method for assisting in providing video streams in a user equipment, the method comprising:
   receiving a list of identity information of other users sent by the video server; and
   sending identity information of one of other users selected from the list of identity information to a video server;
   wherein other users are users other than a user using the user equipment, the list of identity information is determined by the video server according to user-related information, scenario information of the user's video-watching, and feature attribute information of the user's video-watching, wherein the video server employing a matching method, in order to match the user-related information, scenario information of the user's video-watching and feature attribute information of the user's video-watching on the user equipment with the user-related information of other users, scenario information of other users' video-watching and feature attribute information of other users' video-watching, the identifier information of other users with the highest matching scores and above a certain threshold is sent to the user equipment.

4. The method according to claim 3, further comprising:
   selecting the identity information of one of other users that is wished to be used according to the list of identity information of other users.

5. The method according to claim 3, further comprising:
taking identity information of a friend in a friend list as the identity information of one of other users that is wished to be used.

6. A computer device for providing video streams in a video server, the computer device comprising:
one or more processors; and
a memory for storing the means below to be executed by the one or more processors:
an identification providing means, configured to provide a list of identity information of other users to a user equipment, wherein other users are users other than a user using the user equipment; and
a video providing means, for providing video streams to the user equipment according to the identity information selected by the user equipment;
wherein the identification providing means comprises:
an identification determining unit, configured to determine the list of identity information of other users according to user-related information, scenario information of the user's video-watching, and feature attribute information of the user's video-watching, wherein the video server employing a matching method, in order to match the user-related information, scenario information of the user's video-watching and feature attribute information of the user's video-watching on the user equipment with the user-related information of other users, scenario information of other users' video-watching and feature attribute information of other users' video-watching, the identifier information of other users with the highest matching scores and above a certain threshold is sent to the user equipment; and
an identification distributing unit, configured to send the list of identity information of other users to the user equipment.

7. The computer device according to claim 6, wherein the user-related information comprises at least one of the following:
humanistic attribute information of the user;
social identity information of the user;
family identify information of the user; or
behavior information of the user.

8. A computer device for assisting in providing video streams in a user equipment, the computer device comprising:
one or more processors; and
a memory for storing the means below to be executed by the one or more processors:
a receiving means, configured to receive a list of identity information of other users sent by the video server; and
an identification uploading means, configured to send the identity information of one of other users selected from the list of identity information to a video server;
wherein other users are users other than a user using the user equipment, the list of identity information is determined by the video server according to user-related information, scenario information of the user's video-watching, and feature attribute information of the user's video-watching, wherein employing a matching method, in order to match the user-related information, scenario information of the user's video-watching and feature attribute information of the user's video-watching on the user equipment with the user-related information of other users, scenario information of other users' video-watching and feature attribute information of other users' video-watching, the identifier information of other users with the highest matching scores and above a certain threshold is sent to the user equipment.

9. The computer device according to claim 8, the means to be executed by the one or more processors further comprising:
a first selecting means, configured to select the identity information of one of other users that is wished to be used according to the list of identity information of other users.

10. The computer device according to claim 8, wherein the means to be executed by the one or more processors further comprises:
a second selecting means, configured to take the identity information of a friend in a friend list as the identity information of one of other users that is wished to be used.

* * * * *